US012645610B2

(12) United States Patent
Hassan et al.

(10) Patent No.: US 12,645,610 B2
(45) Date of Patent: Jun. 2, 2026

(54) OBJECT-LEVEL METADATA LOCATOR

(71) Applicant: NVIDIA Corporation, Santa Clara, CA (US)

(72) Inventors: Mohamed Tarek Bnziad Mohamed Hassan, Lowell, MA (US); Aamer Jaleel, Northborough, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 97 days.

(21) Appl. No.: 18/774,806

(22) Filed: Jul. 16, 2024

(65) Prior Publication Data

US 2025/0190373 A1 Jun. 12, 2025

Related U.S. Application Data

(60) Provisional application No. 63/608,685, filed on Dec. 11, 2023.

(51) Int. Cl.
*G06F 12/14* (2006.01)
*G06F 21/52* (2013.01)

(52) U.S. Cl.
CPC .......... *G06F 12/1416* (2013.01); *G06F 21/52* (2013.01); *G06F 2212/1052* (2013.01)

(58) Field of Classification Search
None
See application file for complete search history.

(56) References Cited

U.S. PATENT DOCUMENTS

| | | | | | |
|---|---|---|---|---|---|
| 5,075,842 A | * | 12/1991 | Lai | ........................ | G06F 9/4488 |
| | | | | | 711/E12.095 |
| 2008/0140968 A1 | * | 6/2008 | Doshi | ................. | G06F 12/1466 |
| | | | | | 711/E12.091 |
| 2008/0222397 A1 | * | 9/2008 | Wilkerson | ............ | G06F 12/145 |
| | | | | | 712/E9.016 |
| 2013/0205285 A1 | * | 8/2013 | Pizlo | ................... | G06F 9/45516 |
| | | | | | 717/151 |
| 2016/0092341 A1 | * | 3/2016 | Ma | ...................... | G06F 11/3636 |
| | | | | | 714/45 |

(Continued)

OTHER PUBLICATIONS

Tanenbaum et al. Structured Computer Organization. 2013. Pearson. 6th ed. p. 8.*

(Continued)

*Primary Examiner* — Nathan Sadler
(74) *Attorney, Agent, or Firm* — Zilka-Kotab, P.C.

(57) ABSTRACT

Metadata generally refers to data that describes, or gives information about, other data. Metadata can be used for a wide variety of purposes, including for ensuring the safety of memory accesses. For example, to prevent memory safety errors, metadata, which indicates the base address and size of the data, can be used to validate memory access requests as prerequisite to allowing the memory access. While there are many useful applications of metadata, including for memory safety as mentioned above, the underlying metadata storage and retrieval processes that have been developed to date suffer from various problems. The present disclosure provides an object-level metadata locator, which can allow for an internal object layout to be maintained and which can scale to an arbitrary number of objects while requiring lower memory overhead than that required in the prior art.

60 Claims, 9 Drawing Sheets

(56)                    References Cited

U.S. PATENT DOCUMENTS

| | | | | |
|---|---|---|---|---|
| 2021/0389946 A1* | 12/2021 | Wilkerson | ............ | G06F 9/5044 |
| 2022/0413866 A1* | 12/2022 | Nathella | ............... | G06F 9/3818 |
| 2023/0027329 A1* | 1/2023 | Durham | .................. | G06F 21/54 |
| 2023/0061154 A1 | 3/2023 | Jaleel et al. | | |
| 2023/0393769 A1* | 12/2023 | Durham | .............. | G06F 12/0875 |
| 2025/0139272 A1* | 5/2025 | Moon | ..................... | G06F 21/62 |

OTHER PUBLICATIONS

Unterguggenberger et al. "Multi-Tag: A Hardware-Software Co-Design for Memory Safety based on Multi-Granular Memory Tagging." Jul. 10, 2023. ACM. ASIA CCS '23. pp. 177-189.*

Ziad et al., "cuCatch: A Debugging Tool for Efficiently Catching Memory Safety Violations in CUDA Applications," Proceedings of the ACM on Programming Languages, vol. 7, Jun. 2023, pp. 1-24.

Lee et al., "Securing GPU via Region-based Bounds Checking," Proceedingsof the 49th Annual International Symposium on Computer Architecture (ISCA), 2022, pp. 27-41.

Oleksenko et al., "Intel MPX Explained: A Cross-layer Analysis of the Intel MPX System Stack," Proceedings of the ACM on Measurement and Analysis of Computing Systems, vol. 2, No. 2, Jun. 2018, pp. 1-30.

Bannister, S., "Memory Tagging Extension: Enhancing memory safety through architecture," Arm Community Blogs, Aug. 5, 2019, 5 pages, retrieved from https://community.arm.com/arm-community-blogs/b/architectures-and-processors-blog/posts/enhancing-memory-safety.

Sullivan et al., "Implicit Memory Tagging: No-Overhead Memory Safety Using Alias-Free Tagged ECC," Proceedings of the 50th Annual International Symposium on Computer Architecture (ISCA), Jun. 2023, 13 pages.

Hassan et al., U.S. Appl. No. 18/745,846, filed Jun. 17, 2024.

Akritidis et al., "Baggy Bounds Checking: An Efficient and Backwards-Compatible Defense against Out-of-Bounds Errors," Proceedings of the 18th USENIX Security Symposium, 2009, 16 pages, retrieved from https://www.usenix.org/legacy/events/sec09/tech/full_papers/akritidis.pdf.

Arm, "Welcome to the landing page for Morello Linux," Arm Morello Program, 2024, 3 pages, retrieved from https://www.morello-project.org/.

Bialek et al., "Security analysis of memory tagging," GitHub, Mar. 2020, pp. 1-16, retrieved from https://github.com/microsoft/MSRC-Security-Research/blob/master/papers/2020/Security%20analysis%20of%20memory%20tagging.pdf.

Di et al., "A Study of Overflow Vulnerabilities on GPUs," IFIP International Federation for Information Processing, 2016, pp. 103-115.

Di et al., "GMOD: A Dynamic GPU Memory Overflow Detector," Proceedings of the 27th International Conference on Parallel Architectures and Compilation Techniques, Nov. 2018, pp. 1-13.

Duck et al., "Heap Bounds Protection with Low Fat Pointers," Proceedings of the 25th International Conference on Compiler Construction, Mar. 2016, pp. 132-142.

Dutta et al., "Spy in the GPU-box: Covert and Side Channel Attacks on Multi-GPU Systems," arXiv, 2022, 13 pages, retrieved from https://arxiv.org/pdf/2203.15981.

Erb et al., "Dynamic Buffer Overflow Detection for GPGPUs," Proceedings of the 2017 IEEE/ACM International Symposium on Code Generation and Optimization, 2017, 13 pages, retrieved from https://www.computermachines.org/joe/publications/pdfs/cgo2017_clarmor.pdf.

Erb et al., "clARMOR: A Dynamic Buffer Overflow Detector for OpenCL Kernels," Proceedings of the International Workshop on OpenCL, 2018, 2 pages.

Hawkes, B., "0day 'in the wild'," Google Project Zero, May 15, 2019, 6 pages, retrieved from https://googleprojectzero.blogspot.com/p/0day.html.

Hubbard et al., "Simplifying GPU Application Development with Heterogeneous Memory Management," NVIDIA Developer Tech-nical Blog, Aug. 22, 2023, 19 pages, retrieved from https://developer.nvidia.com/blog/simplifying-gpu-application-development-with-heterogeneous-memory-management/.

Intel, "5-Level Paging and 5-Level EPT," Intel White Paper, May 2017, 31 pages.

Kim et al., "Hardware-based Always-On Heap Memory Safety," 53rd Annual IEEE/ACM International Symposium on Microarchitecture (MICRO), 2020, pp. 1153-1166.

Kim et al., "Flipping Bits in Memory Without Accessing Them: An Experimental Study of DRAM Disturbance Errors," Proceeding of the IEEE 41st Annual International Symposium on Computer Architecture, 2014, pp. 1-12.

Kwon et al., "Low-Fat Pointers: Compact Encoding and Efficient Gate-Level Implementation of Fat Pointers for Spatial Safety and Capability-based Security," Proceedings of the 20th ACM SIGSAC Conference on Computer and Communications Security, 2013, pp. 721-732.

Lemay et al., "Cryptographic Capability Computing," MICRO-54, Proceedings of the 54th Annual IEEE/ACM International Symposium on Microarchitecture, Oct. 2021, pp. 253-267.

Miele, A., "Buffer overflow vulnerabilities in CUDA: a preliminary analysis," Journal of Computer Virology and Hacking Techniques, 2016, 12 pages, retrieved from https://scholar.google.ch/citations?view_op=view_citation&hl=en&user=QN__-okAAAAJ&citation_for_view=QN__-okAAAAJ:IjCSPb-OGe4C.

Miller, M., "Trends, challenges, and strategic shifts in the software vulnerability mitigation landscape," presentation, BlueHat IL, Feb. 7, 2019, 32 pages, retrieved from https://github.com/Microsoft/MSRC-Security-Research/blob/master/presentations/2019_02_BlueHatIL/2019_01%20-%20BlueHatIL%20-%20Trends%2C%20challenge%2C%20and%20shifts%20in%20software%20vulnerability%20mitigation.pdf.

Hassan, M., "Hardware-Software Co-design for Practical Memory Safety: Chapter 5," Dissertation, Columbia University, 2022, 212 pages.

Na et al., "Penetrating Shields: A Systematic Analysis of Memory Corruption Mitigations in the Spectre Era," arXiv, 2023, 17 pages, retrieved from https://arxiv.org/pdf/2309.04119.

Nagarakatte et al., "Watchdog: Hardware for Safe and Secure Manual Memory Management and Full Memory Safety," Proceedings of the 39th International Symposium on Computer Architecture (ISCA), 2012, pp. 1-12.

Nagarakatte et al., "SoftBound: Highly Compatible and Complete Spatial Memory Safety for C," Proceedings of the 30th ACM SIGPLAN Conference on Programming Language Design and Implementation (PLDI), 2009, pp. 1-14.

Nayak et al., "(Mis)managed: A Novel TLB-based Covert Channel on GPUs," Proceedings of the 2021 ACM Asia Conference on Computer and Communications Security, Jun. 2021, 14 pages.

Edwards, K., "RMM: RAPIDS Memory Manager," GitHub, 2024, 15 pages, retrieved from https://github.com/rapidsai/rmm.

Oracle, "Hardware-Assisted Checking Using Silicon Secured Memory (SSM)," Oracle, 2015, 6 pages, retrieved from https://docs.oracle.com/cd/E37069_01/html/E37085/gphwb.html.

Park et al., "Mind control attack: Undermining deep learning with GPU memory exploitation," Science Direct Computers & Security, vol. 102, 2021, pp. 1-16.

Parker et al., "OptiX: A General Purpose Ray Tracing Engine," ACM Transactions on Graphics (SIGGRAPH), Aug. 2010, 13 pages, retrieved from https://research.nvidia.com/publication/2010-08_optix-general-purpose-ray-tracing-engine.

Partap et al., "Memory Tagging: A Memory Efficient Design," arXiv, 2022, 16 pages, retrieved from https://arxiv.org/pdf/2209.00307.

Saileshwar et al., "HeapCheck: Low-cost Hardware Support for Memory Safety," ACM Transactions on Architecture and Code Optimization, vol. 19, No. 1, Jan. 2022, pp. 1-24.

Sasaki et al., "Practical Byte-Granular Memory Blacklisting using Califorms," in MICRO-52: Proceedings of the 52nd Annual IEEE/ACM International Symposium on Microarchitecture, Oct. 2019, pp. 558-571.

Serebryany et al., "AddressSanitizer: A Fast Address Sanity Checker," Proceedings of the USENIX Annual Technical Conference (ATC),

(56) References Cited

OTHER PUBLICATIONS

Jun. 2012, 10 pages, retrieved from https://www.usenix.org/conference/atc12/technical-sessions/presentation/serebryany.

Sharifi et al., "CHEx86: Context-Sensitive Enforcement of Memory Safety via Microcode-Enabled Capabilities," ACM/IEEE 47th Annual International Symposium on Computer Architecture (ISCA), 2020, 14 pages, retrieved from https://scholar.google.com/citations?view_op=view_citation&hl=en&user=PJwZvg8AAAAJ&citation_for_view=PJwZvg8AAAAJ:d1gkVwhDpl0C.

Side et al., "LockedDown: Exploiting Contention on Host-GPU PCIe Bus for Fun and Profit," IEEE 7th European Symposium on Security and Privacy (EuroS&P), 2022, pp. 270-285.

Sinha et al., "Practical Memory Safety with REST," author's preprint, Proceedings of the 45th Annual International Symposium on Computer Architecture, Jun. 2018, 12 pages.

Song et al., "SoK: Sanitizing for security," IEEE Symposium on Security and Privacy, 2019, pp. 1275-1295.

Szekeres et al., "SoK: Eternal War in Memory," IEEE Symposium on Security and Privacy, 2013, pp. 48-62.

Tang et al., "CLKSCREW: Exposing the Perils of Security-Oblivious Energy Management," Proceedings of the 26th USENIX Conference on Security Symposium (SEC), Aug. 2017, pp. 1057-1074.

Ziad et al., "No-FAT: Architectural Support for Low Overhead Memory Safety Checks," author preprint, ISCA-48: Proceedings of the 48th Annual International Symposium on Computer Architecture, Jun. 2021, 15 pages, retrieved from https://www.cs.columbia.edu/~mtarek/files/preprint_ISCA21_NoFAT.pdf.

Unterguggenberger et al., "Multi-Tag: A Hardware-Software Co-Design for Memory Safety based on Multi-Granular Memory Tagging," Proceedings of the ACM Asia Conference on Computer and Communications Security (ASIA CCS), Jul. 2023, pp. 177-189.

Van Der Veen et al., "Memory Errors: The Past, the Present, and the Future?" in Research in Attacks, Intrusions, and Defenses (RAID), 2012, Sep. 2012, 21 pages, retrieved from https://www.researchgate.net/publication/236278779_Memory_Errors_The_Past_the_Present_and_the_Future.

Villa et al., "Need for Speed: Experiences Building a Trustworthy System-Level GPU Simulator," Proceedings of the 2021 IEEE International Symposium on High-Performance Computer Architecture (HPCA), 2021, 13 pages, retrieved from https://d1qx31qr3h6wln.cloudfront.net/publications/HPCA_2021_NVArchSim.pdf.

Watson et al., "CHERI: A Hybrid Capability-System Architecture for Scalable Software Compartmentalization," IEEE Symposium on Security and Privacy, 2015, pp. 20-37.

Woodruff et al., "CHERI Concentrate: Practical Compressed Capabilities," IEEE Transactions on Computers, Oct. 2019, pp. 1-15, retrieved from https://www.semanticscholar.org/paper/CHERI-Concentrate%3A-Practical-Compressed-Woodruff-Joannou/c58d79126ad5e1be7174100775d71af203d9ae37.

Xia et al., "CHERIvoke: Characterising Pointer Revocation using CHERI Capabilities for Temporal Memory Safety," Proceedings of the 52nd Annual IEEE/ACM International Symposium on Microarchitecture (MICRO-52), Oct. 2019, pp. 545-557.

Zhang et al., "Tunnels for Bootlegging: Fully Reverse-Engineering GPU TLBs for Challenging Isolation Guarantees of NVIDIA MIG," Proceedings of the ACM Conference on Computer and Communications (CCS), Nov. 2023, pp. 960-974.

Nvidia, "Compute Sanitizer," NVIDIA, v2023.1.1, Mar. 2023, 56 pages, retrieved from https://web.archive.org/web/20230425163939/https://docs.nvidia.com/compute-sanitizer/pdf/ComputeSanitizer.pdf.

Zhang et al., "LAK: A Low-Overhead Lock-and-Key Based Schema for GPU Memory Safety," IEEE 40th International Conference on Computer Design (ICCD), 2022, pp. 705-713.

* cited by examiner

100 responsive to a memory access request having a pointer to an object in memory, determine a page corresponding to the pointer
102 process page-level metadata stored for the page to locate object-level metadata stored for the object
104 perform at least one task specific to the object using the object-level metadata
106

150 responsive to a memory access request having a pointer to an object in memory, accessing a portion of memory storing a bit vector that tracks one or more object base addresses
152 using the bit vector to locate object-level metadata stored for the object
154 performing at least one task specific to the object using the object-level metadata
156

400

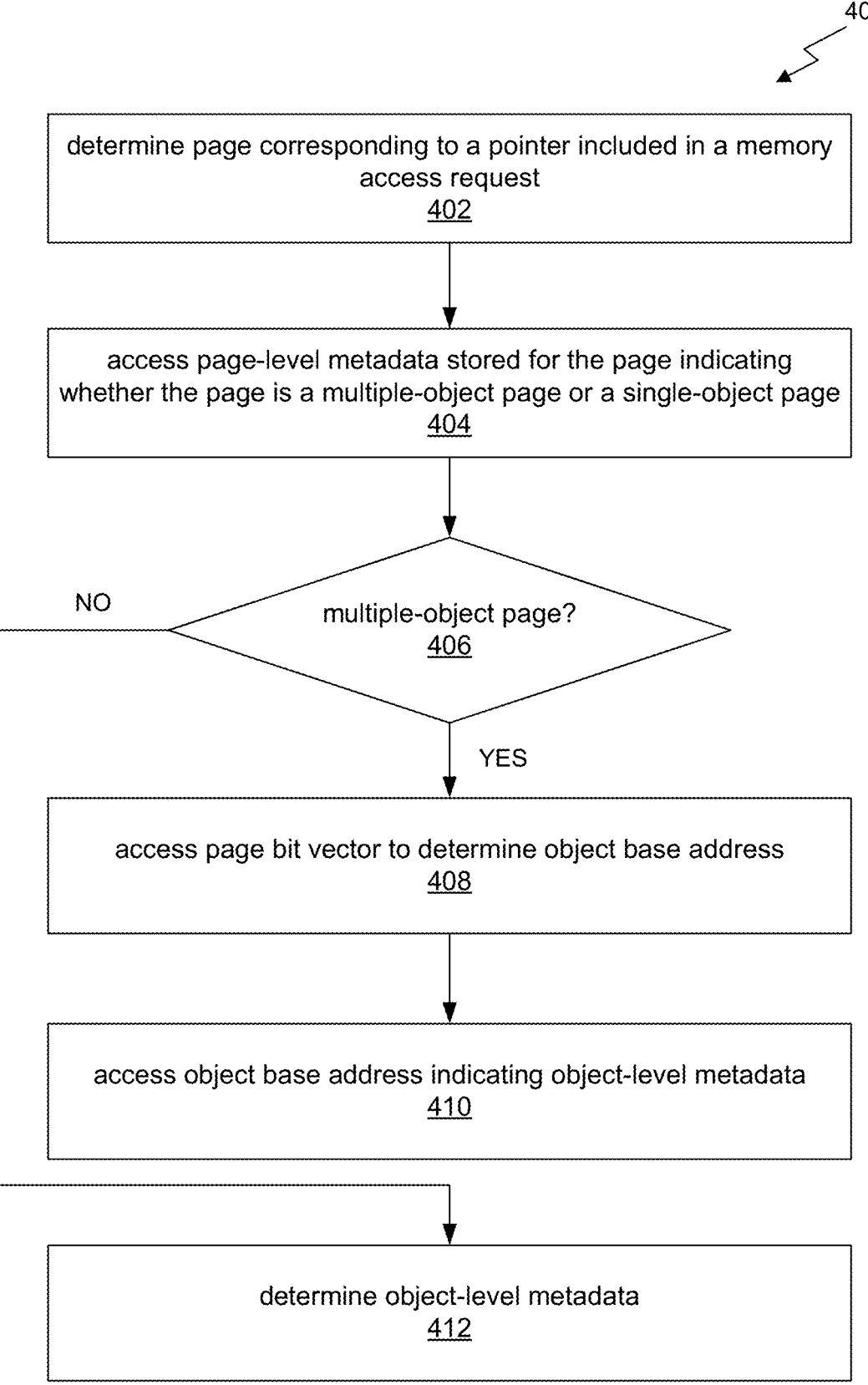

determine page corresponding to a pointer included in a memory access request
402 access page-level metadata stored for the page indicating whether the page is a multiple-object page or a single-object page
404 multiple-object page?
406

NO

YES access page bit vector to determine object base address
408 access object base address indicating object-level metadata
410 determine object-level metadata
412

*Fig. 4*

500 receive a memory access request having a pointer to an object
502 access object-level metadata stored for the object
504 perform memory safety check using the object-level metadata
506 safe memory condition?
508

NO

YES perform the memory access
510 return an indication of an unsafe memory condition
512

600

OBJECT-LEVEL METADATA LOCATOR

CLAIM OF PRIORITY

This application claims the benefit of U.S. Provisional Application No. 63/608,685, titled "PER-OBJECT META-DATA LOCATOR FOR EFFICIENT MEMORY SAFETY," filed Dec. 11, 2023, the entire contents of which are incorporated herein by reference.

TECHNICAL FIELD

The present disclosure relates to metadata storage and retrieval processes.

BACKGROUND

Metadata generally refers to data that describes, or gives information about, other data. Metadata can be used for a wide variety of purposes, including for ensuring the safety of memory accesses. For example, applications written in memory unsafe languages, such as C, C++, and CUDA, are vulnerable to a variety of memory safety errors because they do not validate the bounds and lifetime of memory accesses. These memory safety errors can lead to control-flow hijacking, silent data corruption, difficult-to-diagnose crashes, and security exploitation. To prevent memory safety errors, metadata, which indicates the base address and size of the data, has been used to validate memory access requests as prerequisite to allowing the memory access.

While there are many useful applications of metadata, including for memory safety as mentioned above, the underlying metadata storage and retrieval processes that have been developed to date suffer from various problems. For example, techniques that increase the pointer size to allow the pointer to carry the metadata sacrifice compatibility with un-instrumented system components since changing the pointer size changes the layout of object that contain pointers in memory. As another example, techniques that require special memory allocation behavior cannot cope with heterogeneous system with diverse memory allocators. As a further example, techniques that use upper pointer bits as a table index for retrieving the base and size of live objects do not scale to an arbitrarily large number of live allocations. Still yet, techniques that maintain a proportional metadata storage to the program memory footprint incur high memory overheads for large memory workloads.

There is thus a need for addressing these and/or other issues associated with the prior art. For example, there is a need to provide efficient object-level metadata tracking and locating processes, which can allow for an internal object layout to be maintained and which can scale to an arbitrary number of objects while requiring lower memory overhead that that required in the prior art.

SUMMARY

A method, non-transitory computer-readable media, and system are disclosed to locate object-level metadata. In an embodiment, responsive to a memory access request having a pointer to an object in memory, a page corresponding to the pointer is determined. Page-level metadata stored for the page is processed to locate object-level metadata stored for the object. At least one task specific to the object is performed using the object-level metadata.

In another embodiment, responsive to a memory access request having a pointer to an object in memory, a portion of memory storing a bit vector that tracks one or more object base addresses is accessed. The bit vector is used to locate object-level metadata stored for the object. At least one task specific to the object is performed using the object-level metadata.

BRIEF DESCRIPTION OF THE DRAWINGS

FIG. 4 illustrates a flowchart of a method for locating object-level metadata, in accordance with an embodiment.

DETAILED DESCRIPTION

Figure 1A:
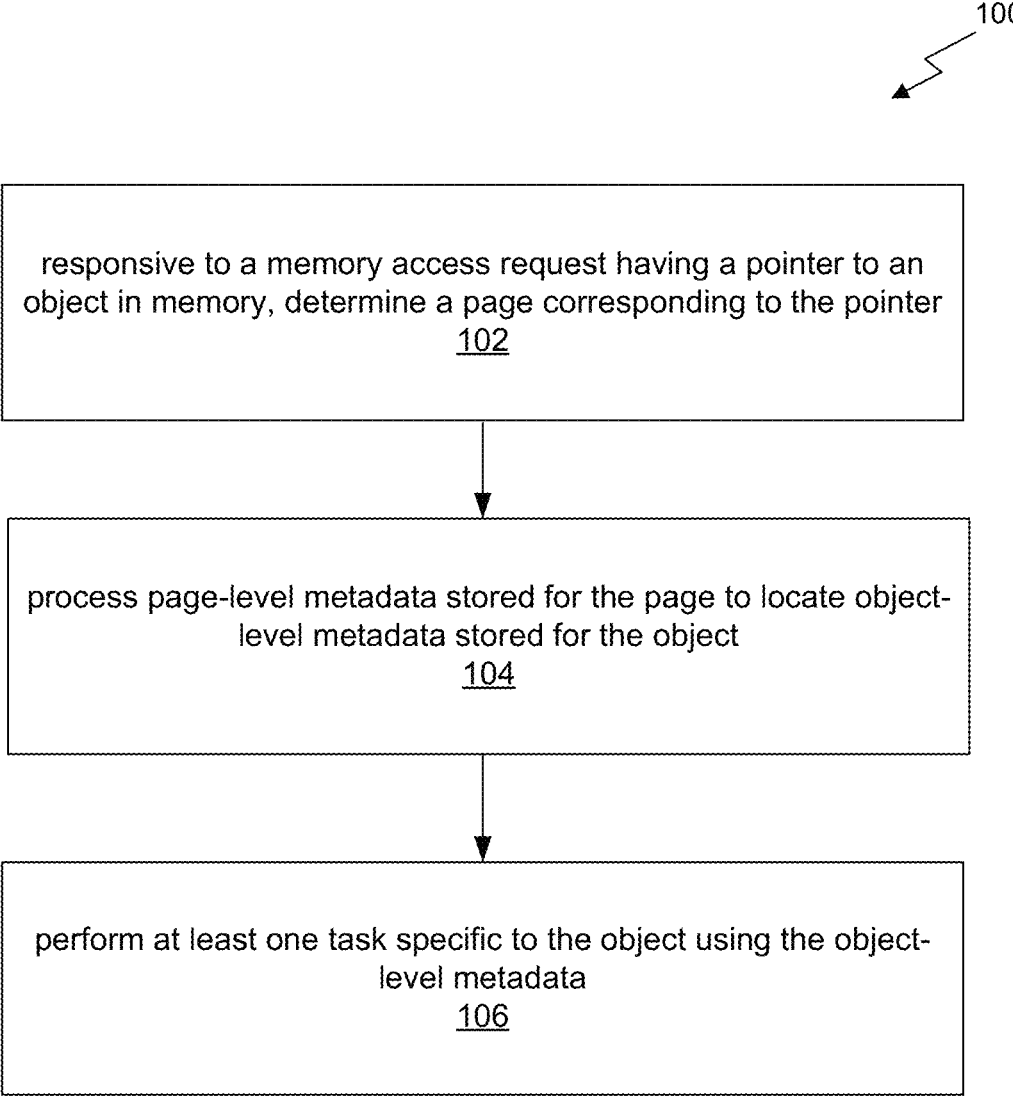
FIG. 1A illustrates a flowchart of a method for locating object-level metadata using page-level metadata, in accordance with an embodiment.

FIG. 1A illustrates a flowchart of a method 100 for locating object-level metadata using page-level metadata, in accordance with an embodiment. In an embodiment, the method 100 may be performed by a combination of software and hardware. In an embodiment, the method 100 may be performed using only software. In an embodiment, the method 100 may be performed using only hardware. In embodiments, the hardware may be a graphics processing unit (GPU), a central processing unit (CPU), a specialized hardware, and/or any other computer hardware configured to perform the method 100.

In an embodiment, the hardware may be included in a device, which may be comprised of a processing unit, a program, custom circuitry, or a combination thereof, in an embodiment. In another embodiment, the hardware may be included in a system, which may be comprised of a non-transitory memory storage comprising software (instructions) and one or more processors in communication with the memory which execute the software. As an example, the method 100 may be performed in the context of the devices in the network architecture 600 of FIG. 6 and/or in the context of the system 700 of FIG. 7.

In an embodiment, the method 100 may be performed during execution of a computer program having a memory access request with a pointer to an object in memory. As described below, in the present method 100 the memory access request causes the object-level metadata to be located and used to perform at least one task in association with the object. In an embodiment, a compiled version of the computer program may include one or more instructions that cause the method 100 to be performed.

In operation 102, responsive to a memory access request having a pointer to an object in memory, a page corresponding to the pointer is determined. The memory access request refers to a function of a computer program. The memory access request is configured to cause memory to be accessed. In particular, the memory access request includes a pointer to a memory region. The memory region represents the object when the memory region has been allocated by a programmer, and in this case the memory access request having the pointer to the object will work correctly to access the object.

In an embodiment, the pointer may point to an arbitrary location in the object. In other words, the pointer does not necessarily have to point to a base address of the object. The computer program may be any program written in a programming language, such as C, C++, CUDA, etc.

It should be noted that in another possible embodiment the memory region may not have been allocated, such that the pointer does not actually point to an intended object. In this case, the memory access request having the pointer to the object will not work correctly. This situation may be detected via a verification process, as described in detail below. In various embodiments, the memory referred to herein may be virtual memory, GPU global memory, local memory, shared memory, or any other type of memory storing an object capable of being accessed via a memory access request.

As mentioned, responsive to the memory access request having the pointer to the object, a page corresponding to the pointer is determined. The page refers to a (e.g. fixed-length) contiguous block of (e.g. virtual) memory that may be described by a single entry in a page table having a plurality of entries for different pages. The pointer may point to a location in the page, in an embodiment. In an embodiment, an address included in the pointer may be used to determine the page.

In operation 104, page-level metadata stored for the page is processed to locate object-level metadata stored for the object. The page-level metadata refers to data that is at least usable to locate object-level metadata stored for the object. In an embodiment, the page-level metadata may be stored in the page. In an embodiment, the page-level metadata may be stored in the same page (with the data) or in a different page. In an embodiment, the page-level metadata may be stored when the object is created.

In an embodiment, the page-level metadata may indicate a type of the page. In an embodiment, the page-level metadata may indicate whether the page is a single-object page (i.e. stores a single object) or a multiple-object page (i.e. stores multiple objects) or even a hybrid that stores part of a large object in addition to other multiple (smaller) objects. In an embodiment, the page-level metadata may directly indicate (e.g. record) a location of the object-level metadata. In another embodiment, the page-level metadata may indicate a page bit vector from which the object-level metadata may be located.

For example, in an embodiment, processing the page-level metadata may include determining from the page-level metadata a type of the page. As mentioned above, the type of the page is determined as one of a single-object page or a multiple-object page. In an embodiment, processing the page-level metadata may include, responsive to determining from the page-level metadata that the type of the page is the single-object page, reading a location of the object-level metadata directly from the page-level metadata.

In another embodiment, processing the page-level metadata may include, responsive to determining from the page-level metadata that the type of the page is the multiple object page, determining from the page-level metadata a location of a page bit vector and a location of a page bit vector type. In this embodiment, the page bit vector and the page bit vector type may be processed to locate the object-level metadata. For example, processing the page bit vector and the page bit vector type may include computing an offset within the page bit vector and an offset within the page bit vector type, based on the pointer, and determining from the page bit vector type at a location indicated by the offset within the page bit vector type whether a preconfigured portion of the page bit vector at a location indicated by the offset within the page bit vector corresponds to a single object or to multiple objects. Responsive to determining that the preconfigured portion of the page bit vector corresponds to a single object, the object-level metadata may be located from the offset in the preconfigured portion of the page bit vector. On the other hand, responsive to determining that the preconfigured portion of the page bit vector corresponds to multiple objects, the portion of the page bit vector may be backward scanned from the pointer until an entry in the portion of the page bit vector is found to locate the object-level metadata.

The object-level metadata refers to data that is stored specifically for the object. In an embodiment, the object-level metadata may be created and stored when the object is created in the memory. In an embodiment, the object-level metadata is stored adjacent to the object in the memory. In another embodiment, the object-level metadata may be stored as a header to the object in the memory. In an embodiment, the object-level metadata may be located at a base address of the object.

The object-level metadata may be of any type that is required for performing one or more intended tasks associated with the memory access request (described below). In an exemplary embodiment where the task is a memory safety check, the object-level metadata may include a size of the object and/or a tag that is required for performing the memory safety check.

To this end, operation 104 is performed to locate the object-level metadata from the page-level metadata of the page pointed to by the memory access request. In operation 106, at least one task specific to the object is performed using the object-level metadata. As an option, the object-level metadata may be verified prior to performing the at least one task.

In an embodiment, the verification may include verifying that a difference between a base address associated with the pointer and a location of the object-level metadata (i.e. in the memory) is smaller than a size indicated in the object-level metadata. In this embodiment, the verification may fail when the difference between the base address associated with the pointer and the location of the object-level metadata is greater than the size indicated in the object-level metadata. Likewise, the verification may succeed when the difference between the base address associated with the pointer and the location of the object-level metadata is smaller than (or equal to) the size indicated in the object-level metadata.

In another embodiment, the verification may include verifying that a tag of the base address associated with the pointer matches a tag indicated in the object-level metadata. In this embodiment, the verification may fail when the tag of the base address associated with the pointer does not match the tag indicated in the object-level metadata. The verification may succeed when the tag of the base address associated with the pointer matches the tag indicated in the object-level metadata.

In an embodiment, a zero (or other error indicator) may be returned when the at least one verification fails. In an embodiment, a zero may be returned when the object-level metadata does not exist. When a zero is returned, an error may be detected and the method 100 may terminate without performing the at least one task. On the other hand, the object-level metadata may be returned when the object-level metadata exists and/or when the at least one verification succeeds.

Returning to operation 106 where the at least one task is performed using the object-level metadata, it should be noted that the task(s) may include any preconfigured instruction, function, process, etc. that uses the object-level metadata. As described above, the task may include a memory safety check, in an embodiment.

The memory safety check refers to predefined method/process by which memory safety of the memory access request is verified using the object-level metadata. The memory safety check may verify spatial memory safety, in an embodiment. A spatial memory safety error may occur when a pointer is used to access an object beyond its intended bounds (i.e. base address and size), such as buffer over-flows or buffer under-flows. If the target of the over-flow is adjacent to the victim buffer, it is referred to as linear overflow (e.g. using a large "size" argument in a memcpy call-site). On the other hand, if the target of the overflow is non-adjacent to the victim buffer, it is referred to as non-linear overflow (e.g. using an arbitrary large array index, a [index]). With regard to checking spatial memory safety, the memory safety check may include computing a difference between the address corresponding to the pointer and the location of the object-level metadata, and raising an exception when the difference is greater than the size.

The memory safety check may verify temporal memory safety, in an embodiment. A temporal memory safety error occurs when a pointer is used to access an object beyond its lifetime. Examples include use-after-free (UAF) in which the program uses a dangling pointer to access a heap object after it is deleted, and use-after-realloc (UAR) in which the dangling pointer is used after the deleted memory is allocated to a new object. With regard to checking temporal memory safety, the memory safety check may include comparing a portion of the address corresponding to the pointer with the tag, and raising an exception when the portion of the address does not match the tag.

To this end, when the memory safety check indicates an unsafe memory condition (i.e. an exception is raised), an indication of the unsafe memory condition (e.g. an error) may be returned. Further, when the memory safety check indicates a safe memory condition (i.e. an exception is not raised), the memory access may be performed.

Of course, the task(s) that may be performed using the object-level metadata is not limited to providing memory safety via the memory safety check mentioned above. Other tasks that may be performed include efficient type checking in memory safe languages, computing fine-grained data encryption and authentication, achieving sub-page level process isolation, providing hints to caches and hardware data prefetchers for software-tuned replacement and prefetching policies, collecting object-aware hardware performance counters, etc.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
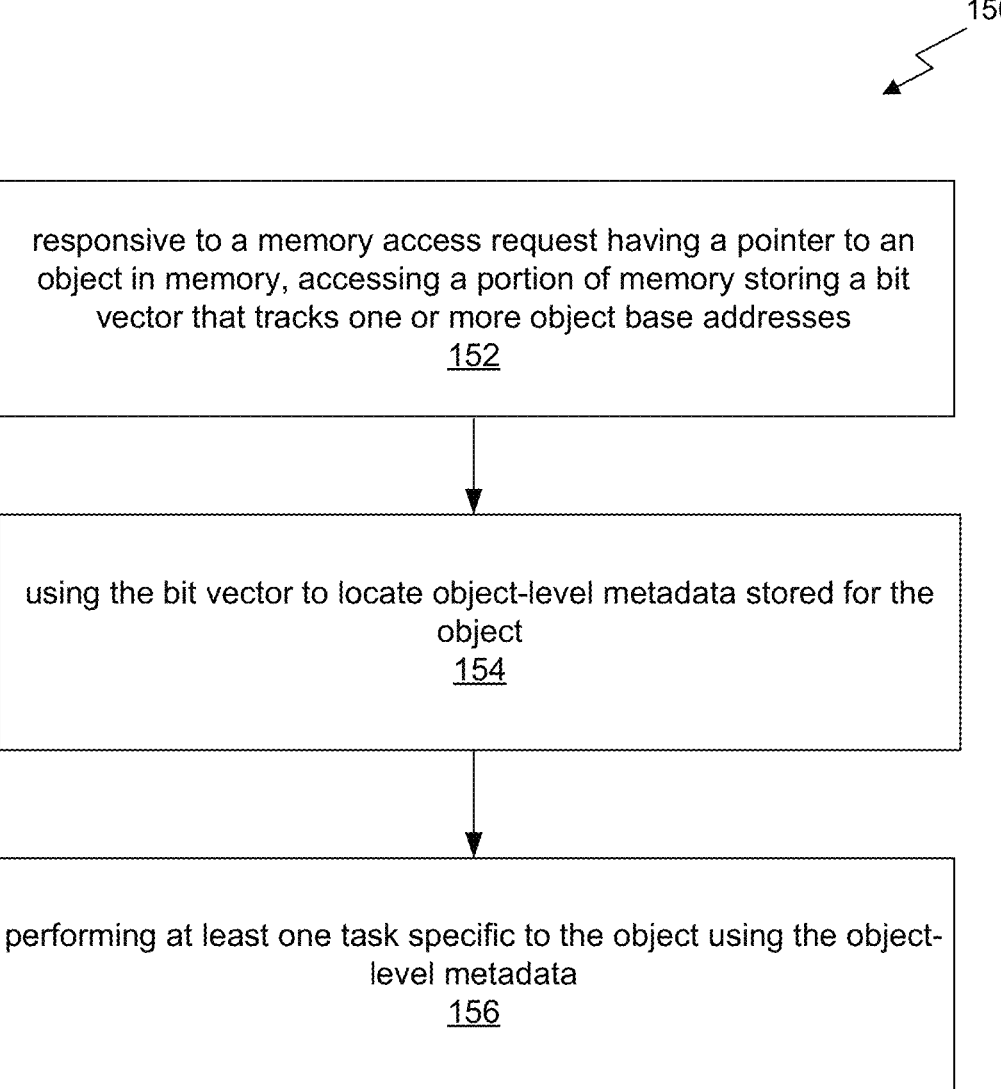
FIG. 1B illustrates a flowchart of a method for locating object-level metadata using a bit vector, in accordance with an embodiment.

FIG. 1B illustrates a flowchart of a method 150 for locating object-level metadata using a bit vector, in accordance with an embodiment. In an embodiment, the method

150 may be performed by a combination of software and hardware. In an embodiment, the method 150 may be performed using only software. In an embodiment, the method 150 may be performed using only hardware. In embodiments, the hardware may be a graphics processing unit (GPU), a central processing unit (CPU), a specialized hardware, and/or any other computer hardware configured to perform the method 150.

In an embodiment, the hardware may be included in a device, which may be comprised of a processing unit, a program, custom circuitry, or a combination thereof, in an embodiment. In another embodiment, the hardware may be included in a system, which may be comprised of a non-transitory memory storage comprising software (instructions) and one or more processors in communication with the memory which execute the software. As an example, the method 150 may be performed in the context of the devices in the network architecture 600 of FIG. 6 and/or in the context of the system 700 of FIG. 7.

It should be noted that the method 150 of the present embodiment is not dependent on the method 100 of FIG. 1A, in an embodiment, and accordingly the method 150 may not necessarily be performed in the context of the method 100 of FIG. 1A. For example, the present method 150 may be performed with respect to a memory system that does not employ memory paging (e.g. a memory system of a micro-controller or an embedded device that does not support memory paging but instead treats the whole memory as a single entity), whereas the method 100 of FIG. 1A accesses page-level metadata and therefore is performed with respect to a memory system that does employ memory paging. Nevertheless, the methods 100 and 150 do involve some of the same or similar operations and thus the definitions and descriptions provided above with respect to the method 100 of FIG. 1A may equally apply to the relevant operations of the present method 150.

In operation 152, responsive to a memory access request having a pointer to an object in memory, a portion of memory storing a bit vector that tracks one or more object base addresses is accessed. The bit vector may be stored in a preconfigured portion of the memory, in an embodiment. Similar to the page bit vector disclosed in other embodiments, the bit vector of the present embodiment includes a plurality of entries where each entry is a single bit that corresponds to a memory address. The entry is set to one (or some other first predefined value) if its corresponding address is an object base address and is set to zero (or some other second predefined value) otherwise. The memory address pointed to by the pointer may therefore correlate with an entry in the bit vector.

In operation 154, the bit vector is used to locate object-level metadata stored for the object. In an embodiment, an entry of the bit vector that corresponds with a memory address pointed to by the pointer may be accessed. A value of the entry may then be determined. For example, when the entry of the bit vector corresponding to the memory address pointed to by the pointer is a "one" then it may be determined that the memory address is the base address location of the object pointed to by the pointer. When the entry is a "zero" then it may be determined that the memory address is not the base address location of the object pointed to by the pointer and the bit vector may be backward scanned to the nearest entry with a value of "one".

In general, backward scanning the bit vector from any arbitrary pointer to the nearest entry with a value of "one" will reveal the base address location of the object pointed to by the pointer. In any case, the object-level metadata may be stored at the base address location of the object, and so from this base address the object-level metadata may be retrieved for the object. In operation 156, at least one task specific to the object is performed using the object-level metadata.

Embodiments described herein disclose object-level metadata, which refers to object-specific metadata, or metadata that is stored on an object-by-object basis. These embodiments can significantly reduce the storage overheads as compared with techniques that use per memory granule metadata (where an object includes multiple successive memory granules), while providing an O(1) common-case metadata lookup when performing any task requiring the object-level metadata for an object.

In some embodiments described herein, upon object creation, the object-level metadata is stored alongside the object itself (i.e. before the starting address of the object) and the location of the object-level metadata (i.e. object base address) is recorded using page-level metadata. To perform any task requiring the object-level metadata for an object, where such task is responsive to a memory access request having a pointer to the object, the page-level metadata is first accessed to locate the object-level metadata, and in particular to locate the base address of the object where the object-level metadata is stored. This page-level metadata to object-level metadata locator process can be accomplished without posing any restrictions on the memory allocator internals.

It should be noted that while various embodiments described below reference particular data sizes in bytes (B), kilobytes (KB) and/or megabytes (MB), the concepts of these embodiments may be implemented using any desired data sizes. Thus, the embodiments described herein may similarly be employed for any other data sizes.

Exemplary Implementation of Object-Level Metadata

When a new object is created, an 8-Byte header (obj_mdata) is stored at the object base address and the base address tracking metadata is populated without changing the memory allocator internals. In an embodiment where the obj_mdata is used for providing memory safety, the object header consists of a random t-bit tag, which is also stored in the upper pointer bits, and an s-bit object size. The tag size, t, depends on the number of available upper pointer bits. It ranges from 7 on modern x86 64 architectures with 57-bit linear virtual address to 16 bits on traditional 48-bit architectures. The remaining (64−t) bits are used for storing the object size. Of course, as noted above, the type of metadata stored may depend on the needs of the particular task that is intended to use the metadata.

In some embodiments, a page bit vector (page_bvec) may also be created per page. The page bit vector tracks the location of the object base addresses. Each entry in the page_bvec is a single bit that corresponds to a potential X-Byte aligned address within the page. The entry is set to one if its corresponding address is an object base address and is set to zero otherwise. In general, backward scanning the page_bvec from any arbitrary pointer to the nearest entry with a value of one will reveal the base address location of the object pointed to by the pointer, and from this base address the object header, obj_mdata, can be loaded for the object.

When an object is deleted from the memory, the corresponding entry in the page-level bit vector is left as-is (i.e. set to one) and the tag field within the object-level metadata is set to a special reserved tag (e.g. 0x7F) to indicate that this memory region has been previously allocated but is currently freed. In this way, dangling pointer accesses to this area may be handled accordingly depending on the preconfigured task processing the object-level metadata. This may include, for example, a memory safety check failing due to a tag mismatch between the reserved tag and the dangling pointer's upper bits.

Figure 2A:
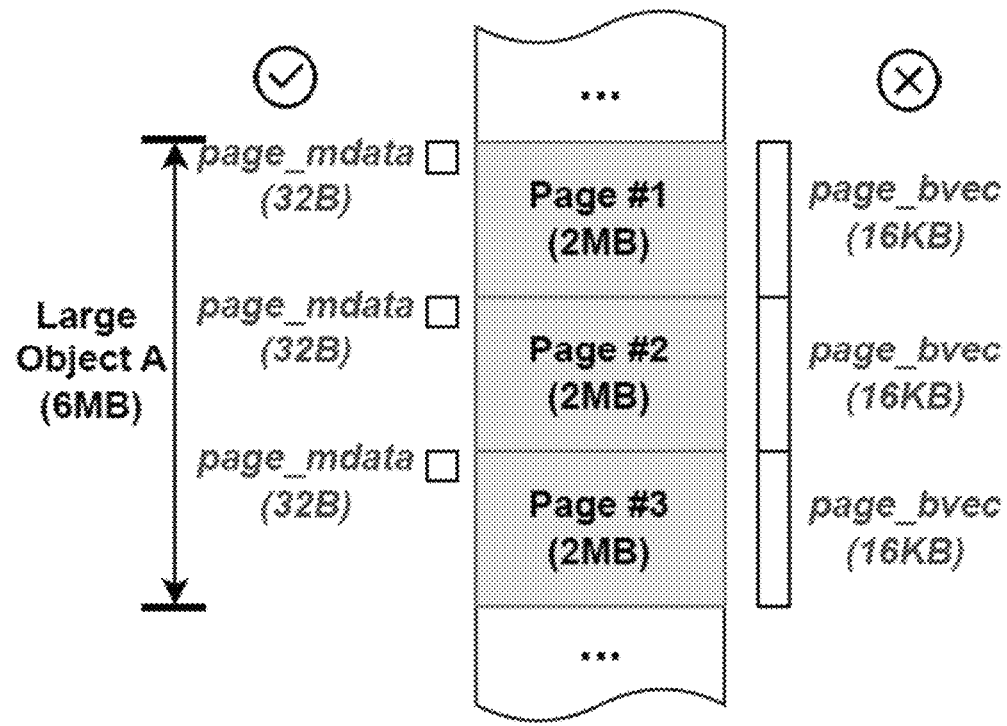
FIG. 2A illustrates metadata storage for single-object pages, in accordance with an embodiment.

FIG. 2A illustrates metadata storage for single-object pages, in accordance with an embodiment. A single-object page refers to a page in memory that stores at least a portion of one object as opposed to storing multiple objects. Thus, for a single-object page, the entire page will belong to a single object.

Figure 3:
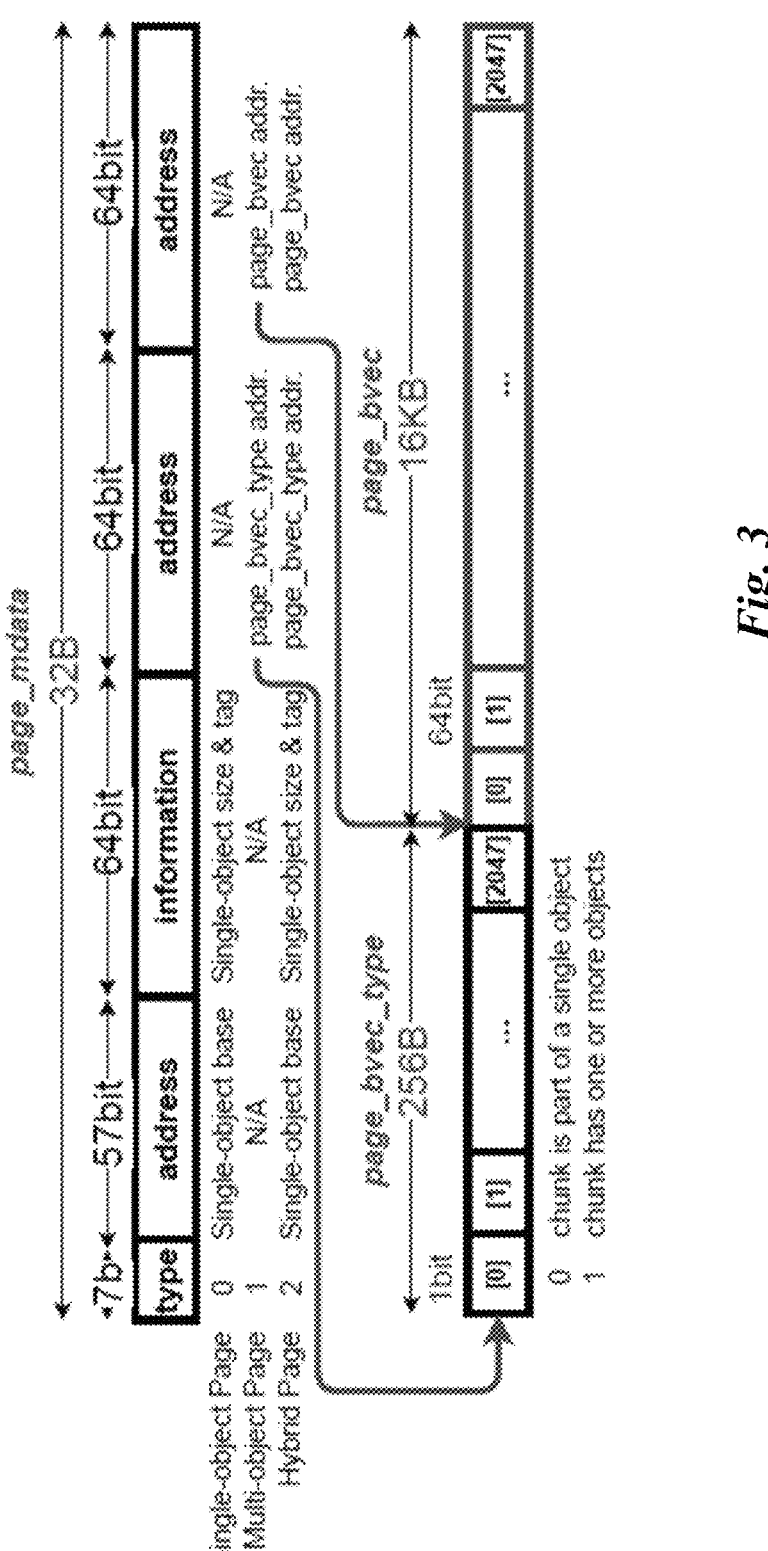
FIG. 3 illustrates a metadata encoding, in accordance with an embodiment.

As shown, a 32B per-page metadata called page-level metadata (page_mdata) is used in the present embodiment instead of a full page_bvec. The format of page_mdata is shown in FIG. 3.

Storing the object metadata (e.g. base address, size, and tag) for each page that is part of a large object (spanning one or more pages) enables the direct retrieval of the metadata for each pointer that points to this page instead of scanning the whole page_bvec. As shown on the left-hand-side of FIG. 2A, for a 6 MB object and 2 MB pages, the page_mdata size is only 32B per page, resulting in 3×32B=96B instead of 3×2 MB/16B=384 Kbit=48 KB. In addition to the space savings, the number of operations needed to find the object metadata is reduced to a single load.

Figure 2B:
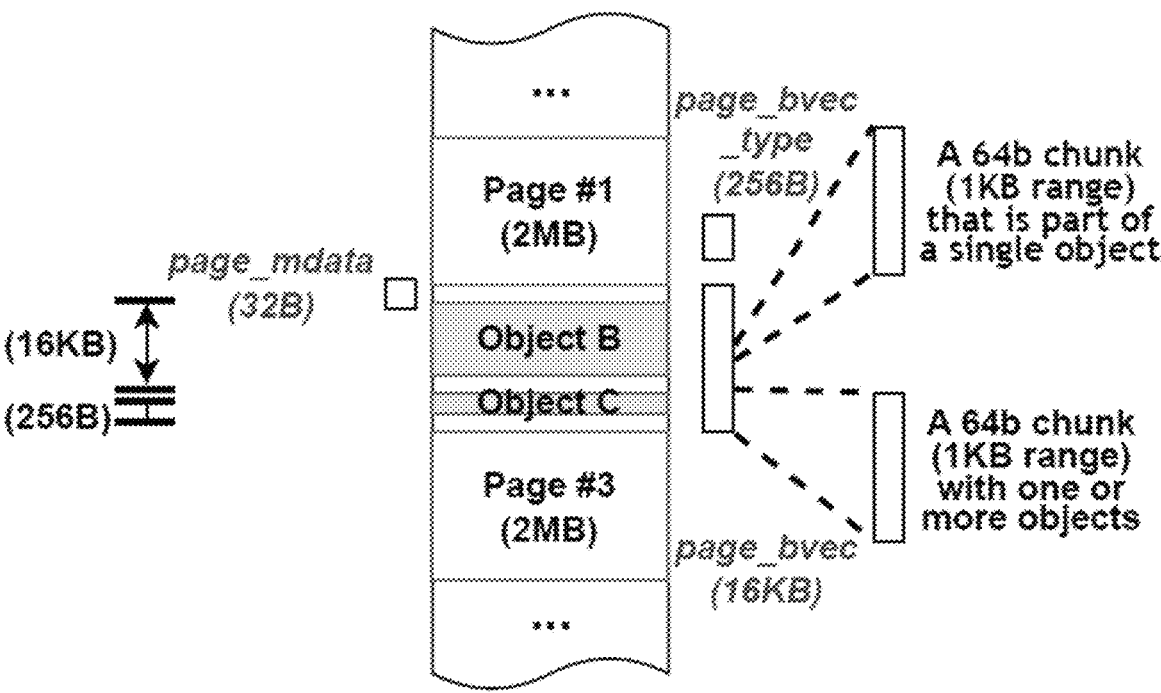
FIG. 2B illustrates metadata storage for multiple-object pages, in accordance with an embodiment.

FIG. 2B illustrates metadata storage for multiple-object pages, in accordance with an embodiment. A multiple-object page refers to a page in memory that stores at least a portion of a plurality of objects as opposed to storing a single object. Thus, for a multiple-object page, the base address of one or more objects will be located within the page.

As shown, the page_bvec is divided into C-bit chunks so that each chunk covers a C×X address range. For example, for X=16B and C=64b, page_bvec is divided into 16 KB/64b=2048 chunks where each chunk is covering 64b× 16B=1024B=1 KB of addresses. If any 1 KB range has one or more objects, its corresponding 64b chunk will have one or more entries set to one. Thus, the location of the base address (and thus obj_mdata) can be identified in a single 64-bit load and scan operation. On the other hand, if a 1 KB range is entirely part of a large object (i.e., 1 KB<size (object)<size (page)), the 64b chunk is re-purposed to store the page offset of this object within the page (e.g. 12-bit offset for a 4 KB page or 21-bit offset for a 2 MB page). This permits the identification of the base address location using a single 64-bit access instead of scanning multiple chunks in the page_bvec. An additional storage for a page bit vector type (page_bvec_type) of 1b per 64b chunk is used to distinguish chunks that are part of a single object from chunks with one or more objects (a total of 2048 additional bits per 2 MB page or 256B). The addresses of page_bvec-_type and page_bvec are stored in separate fields of page_mdata in case of multiple-object pages, as shown in FIG. 3.

FIG. 3 illustrates a metadata encoding for page-level metadata, in accordance with an embodiment.

As shown, the first 16B of the page-level metadata (page_mdata) is divided into a 7-bit page-type field followed by a 57-bit address and a 64-bit information field. For single-object pages, the page-type field is set to zero whereas the address and information fields are set to the single-object (i.e. object-level) metadata (e.g. 57-bit base address and 64-bit size and tag when used for memory safety), respectively. The remaining two 64-bit addresses used for multiple-object pages are set to null for single-object pages.

For multiple-object pages, the page-type field is set to one and the 57-bit address and 64-bit information fields are set to null. The following two 64-bit addresses store page_bvec-_type and page_bvec, respectively. The 64-bit address for page_bvec_type includes 1 bit indicating whether the page_bvec_type is part of a single object or multiple objects.

Metadata Storage for Hybrid Pages

An embodiment is possible where a page might have both cases: a large object whose base address is in a different page, and small objects whose base addresses are within the same page. This case is handled by maintaining both: the object-level metadata (e.g. base, size, and tag) for the object whose base address is not in this page, and the page_bvec-_type and page_bvec addresses for the other objects in the 32B page_mdata, as shown in FIG. 3.

FIG. 4 illustrates a flowchart of a method 400 for locating object-level metadata, in accordance with an embodiment. The method 400 may be carried out in the context of any of the prior disclosed embodiments.

In operation 402, a page corresponding to a pointer included in a memory access request is determined. In operation 404, page-level metadata stored for the page is accessed which indicates whether the page is a multiple-object page or a single-object page. In decision 406, it is determined whether the page is a multiple-object page.

When it is determined from the page-level metadata that the page is not a multiple-object page, or in other words that the page is a single-object page, then the method 400 proceeds to operation 412 to determine the object-level metadata. In particular, in this case the object-level metadata may be directly included in the page-level metadata.

When it is determined from the page-level metadata that the page is a multiple-object page, then the method 400 proceeds to operation 408 to access a page bit vector to determine an object base address. In operation 410, the object base address is accessed which indicates the object-level metadata. In operation 412, the object-level metadata is determined from the object base address.

Implementation of the Method 400 in the Context of the Encoding of FIG. 3

During program execution, when a pointer is used to access a memory object, metadata stored for the object may be retrieved for use in performing some preconfigured task associated with the memory access. For example, this task may include validating whether the memory access is safe.

First, the page number of the input pointer is computed its corresponding page_mdata is read (operations 402-404). The type field in page_mdata read to determine the next step (decision 406). If the type is set to zero (i.e. a single-object page is found), the object-level metadata (e.g. base address, size, and tag) is obtained directly from the first 16B in page_mdata (operation 412). If the page_mdata type field is set to one (i.e. a multiple-object page is found), the addresses of page_bvec_type and page_bvec are read from the second 16B in page_mdata and an offset within both is computed according to the input pointer. Afterwards, both bit vectors are accessed to retrieve the base address location (operation 408). If the target page_bvec_type bit is set to zero, the associated 64-bit chunk contains the offset of the base address within the page. Otherwise, the associated 64-bit chunk is backward scanned from the input pointer until an entry of one is found. Finally, the identified object base address is accessed (operation 410) to load the object header which includes the object-level metadata (operation 412).

In summary a single-step process is used to retrieve the object-level metadata (e.g. base address, size, and tag) of objects stored in single-object pages whereas a three-step process is used to retrieve the same metadata in case of multi-object pages.

Figure 5:
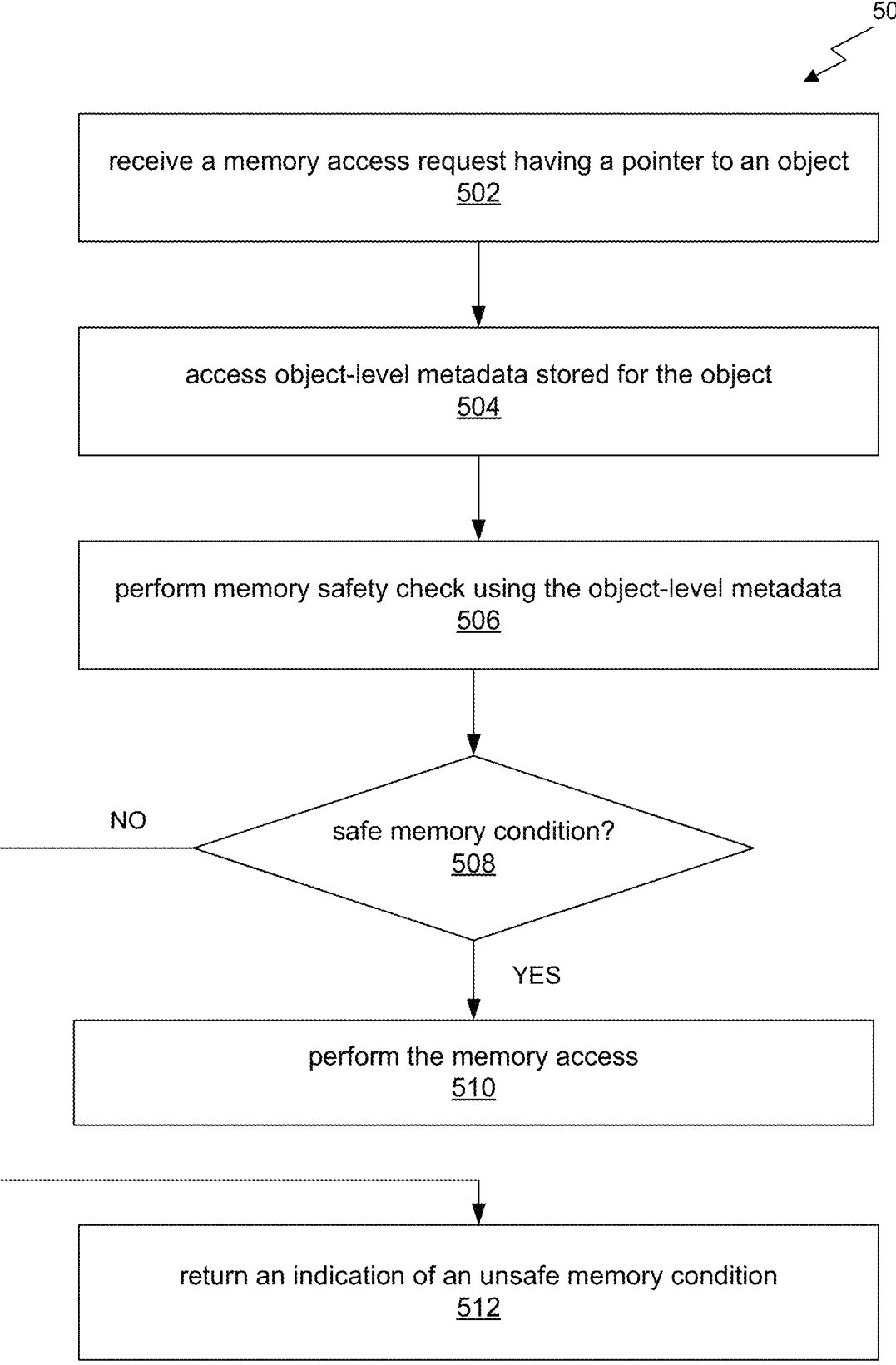
FIG. 5 illustrates a flowchart of a method for using metadata to provide memory safety, in accordance with an embodiment.

FIG. 5 illustrates a flowchart of a method 500 for using metadata to provide memory safety, in accordance with an embodiment. The method 500 may be carried out in the context of any of the prior disclosed embodiments. In an embodiment, the method 500 may be performed during pre-deployment debugging of a computer program having a memory access request. In another embodiment, the method 500 may be performed during post-deployment mitigation of the computer program.

In operation 502, a memory access request having a pointer to an object is received. In operation 504, object-level metadata stored for the object is accessed. This operation 504 may be performed via the method 400 of FIG. 4, for example. In operation 506, a memory safety check is performed using the object-level metadata. For example, the object-level metadata tag may be compared to the tag from the upper bits of the input address (pointer) to detect temporal and spatial safety errors. In addition, a difference between the input address (pointer) and the object's base pointer may be compared to the object's size as indicated in the object-level metadata to detect a base and bounds error.

In decision 508, it is determined whether the memory safety check indicates a safe memory condition. A safe memory condition refers to no errors resulting from the memory safety check. When the memory safety check indicates a safe memory condition, then in operation 510 the memory access is performed to retrieve the object. When the memory safety check indicates an unsafe memory condition, then in operation 512 an indication of the unsafe memory condition is returned (e.g. and the memory access is not performed).

Figure 6:
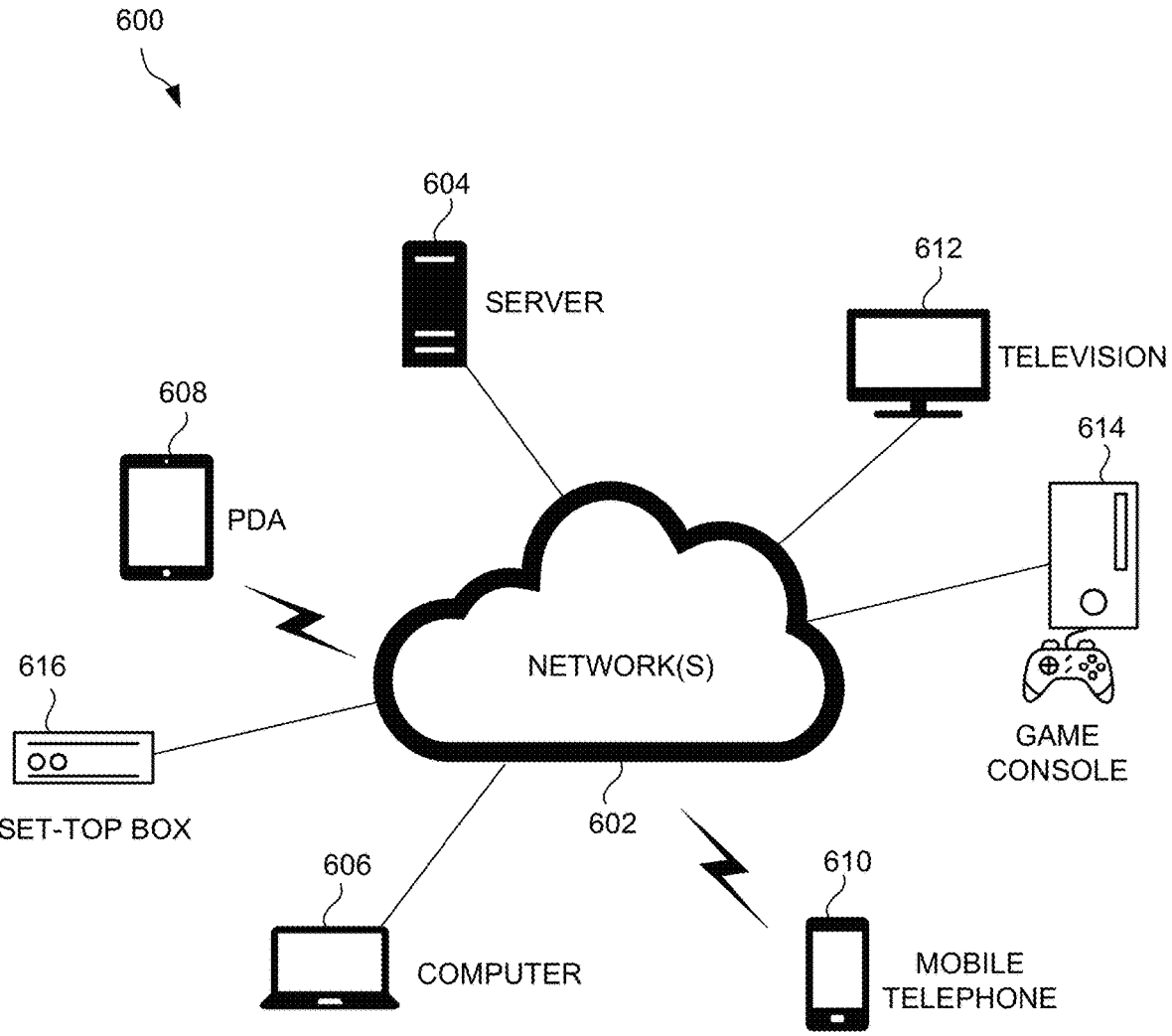
FIG. 6 illustrates a network architecture, in accordance with an embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, a game console 614, a television set-top box 616, etc.

Figure 7:
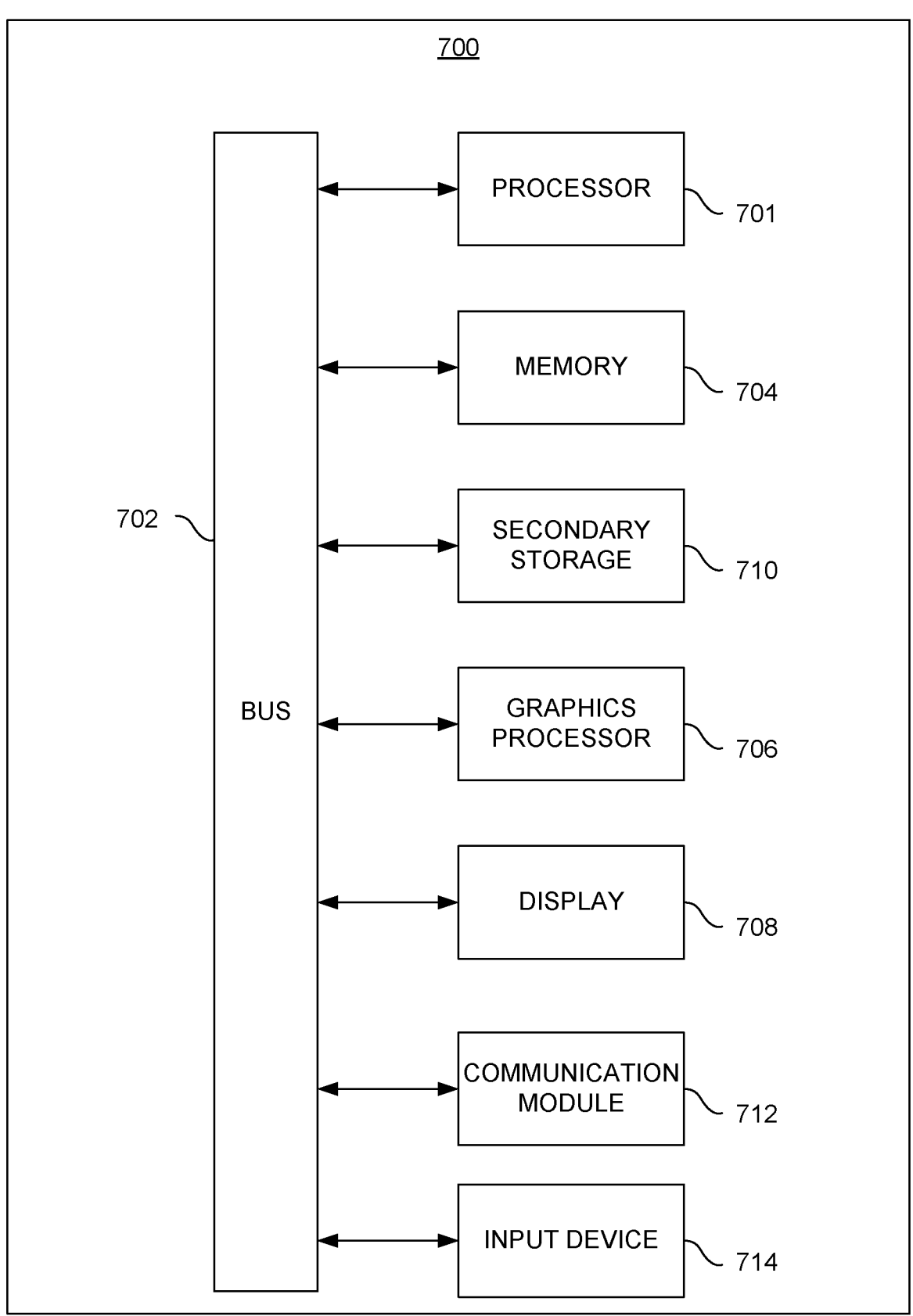
FIG. 7 illustrates an exemplary system, in accordance with an embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As also shown, the system 700 may include one or more input devices 714. The input devices 714 may be wired or wireless input devices. In various embodiments, each input device 714 may include a keyboard, touch pad, touch screen, game controller (e.g. to a game console), remote controller (e.g. to a set-top box or television), or any other device capable of being used by a user to provide input to the system 700.

As described herein, a method, computer readable medium, and system are disclosed to locate object-level metadata. In accordance with FIGS. 1A-5, embodiments may provide a metadata locator process that relies on page-level metadata to locate the object-level metadata, where such object-level metadata may be used for one or more tasks such as a memory safety check involving an access to the object. The embodiments may be implemented in hardware and/or software, which in turn may be implemented in the context of any of the devices depicted in FIGS. 6 and/or 7.

What is claimed is:

1. A method, comprising:

at a device:

responsive to a memory access request having a pointer to an object in memory, determining a page corresponding to the pointer;

processing page-level metadata stored for the page to locate object-level metadata stored for the object, including:

(a) reading a type of the page directly from a first portion of the page-level metadata, the type of the page being one of a single-object page configured to store a single object or a multiple-object page configured to store a plurality of objects, (b) responsive to determining that the type of the page is the single-object page, reading a location of the object-level metadata directly from a second portion of the page-level metadata, and (c) responsive to determining that the type of the page is the multiple-object page, reading a location of a page bit vector directly from a third portion of the page-level metadata, the page bit vector configured to track locations of object base addresses, reading a location of a page bit vector type directly from a fourth portion of the page-level metadata, and using the page bit vector and the page bit vector type to determine the location of the object-level metadata; and performing at least one task specific to the object using the object-level metadata.

2. The method of claim 1, wherein pointer points to an arbitrary location in the object.

3. The method of claim 1, wherein using the page bit vector and the page bit vector type to determine the location of the object-level metadata includes:

computing an offset within the page bit vector and an offset within the page bit vector type, based on the pointer, and determining from the page bit vector type at a location indicated by the offset within the page bit vector type whether a preconfigured portion of the page bit vector at a location indicated by the offset within the page bit vector corresponds to a single object or to multiple objects.

4. The method of claim 3, wherein using the page bit vector and the page bit vector type to determine the location of the object-level metadata further includes:

responsive to determining that the preconfigured portion of the page bit vector corresponds to a single object, locating the object-level metadata from the offset in the preconfigured portion of the page bit vector.

5. The method of claim 3, wherein using the page bit vector and the page bit vector type to determine the location of the object-level metadata further includes:

responsive to determining that the preconfigured portion of the page bit vector corresponds to multiple objects, backward scanning the portion of the page bit vector from the pointer until an entry in the portion of the page bit vector is found to locate the object-level metadata.

6. The method of claim 1, wherein the object-level metadata includes a size of the object.

7. The method of claim 6, wherein the object-level metadata further includes a tag.

8. The method of claim 6, wherein processing the object-level metadata includes using the size of the object to perform a memory safety check.

9. The method of claim 1, wherein the object-level metadata is stored adjacent to the object in the memory.

10. The method of claim 9, wherein the object-level metadata is stored as a header to the object in the memory.

11. The method of claim 1, wherein the object-level metadata is located at a base address of the object.

12. The method of claim 1, wherein the object-level metadata is stored when the object is created.

13. The method of claim 1, wherein the page-level metadata records a location of the object-level metadata.

14. The method of claim 1, wherein the page-level metadata is stored when the object is created.

15. The method of claim 1, wherein the method is implemented using a combination of software and hardware.

16. The method of claim 1, wherein the method is implemented using only software.

17. The method of claim 1, wherein the method is implemented using only hardware.

18. The method of claim 17, wherein the hardware is a graphics processing unit (GPU).

19. The method of claim 17, wherein the hardware is a central processing unit (CPU).

20. The method of claim 1, wherein the memory is virtual memory.

21. The method of claim 1, wherein the memory is GPU global memory.

22. The method of claim 1, wherein the memory is local memory.

23. The method of claim 1, wherein the memory is shared memory.

24. The method of claim 1, wherein the at least one task includes providing memory safety.

25. The method of claim 24, wherein the memory safety includes spatial memory safety.

26. The method of claim 24, wherein the memory safety includes temporal memory safety.

27. The method of claim 1, wherein the at least one task includes performing type checking in memory safe languages.

28. The method of claim 1, wherein the at least one task includes computing data encryption and authentication.

29. The method of claim 1, wherein the at least one task includes achieving sub-page level process isolation.

30. The method of claim 1, wherein the at least one task includes providing hints to caches and hardware data prefetchers for software-tuned replacement and prefetching policies.

31. The method of claim 1, wherein the at least one task includes collecting object-aware hardware performance counters.

32. A non-transitory computer-readable media storing software which when executed by one or more processors of a device cause the device to:

responsive to a memory access request having a pointer to an object in memory, determine a page corresponding to the pointer;

process page-level metadata stored for the page to locate object-level metadata stored for the object, including:

(a) reading a type of the page directly from a first portion of the page-level metadata, the type of the page being one of a single-object page configured to store a single object or a multiple-object page configured to store a plurality of objects, (b) responsive to determining that the type of the page is the single-object page, reading a location of the object-level metadata directly from a second portion of the page-level metadata, and (c) responsive to determining that the type of the page is the multiple-object page, reading a location of a page bit vector directly from a third portion of the page-level metadata, the page bit vector configured to track locations of object base addresses, reading a location of a page bit vector type directly from a fourth portion of the page-level metadata, and using the page bit vector and the page bit vector type to determine the location of the object-level metadata; and perform at least one task specific to the object using the object-level metadata.

33. The non-transitory computer-readable media of claim 32, wherein the at least one task is a memory safety check, and wherein:

when the memory safety check indicates an unsafe memory condition, returning an indication of the unsafe memory condition, and when the memory safety check indicates a safe memory condition, performing the memory access.

34. A system, comprising:

at least one of hardware of a computer or software stored on a non-transitory memory storage of the computer and executable by a processor of the computer, wherein the at least one of the hardware or the software is configured to:

responsive to a memory access request having a pointer to an object in memory, determine a page corresponding to the pointer;

process page-level metadata stored for the page to locate object-level metadata stored for the object, including:

(a) reading a type of the page directly from a first portion of the page-level metadata, the type of the page being one of a single-object page configured to store a single object or a multiple-object page configured to store a plurality of objects, (b) responsive to determining that the type of the page is the single-object page, reading a location of the object-level metadata directly from a second portion of the page-level metadata, and (c) responsive to determining that the type of the page is the multiple-object page, reading a location of a page bit vector directly from a third portion of the page-level metadata, the page bit vector configured to track locations of object base addresses, reading a location of a page bit vector type directly from a fourth portion of the page-level metadata, and using the page bit vector and the page bit vector type to determine the location of the object-level metadata; and perform at least one task specific to the object using the object-level metadata.

35. The system of claim 34, wherein a combination of the software and the hardware determines the page, processes the page-level metadata and performs the at least one task.

36. The system of claim 34, wherein only the software determines the page, processes the page-level metadata and performs the at least one task.

37. The system of claim 34, wherein only the hardware determines the page, processes the page-level metadata and performs the at least one task.

38. The system of claim 34, wherein the hardware is a graphics processing unit (GPU).

39. The system of claim 34, wherein the hardware is a central processing unit (CPU).

40. The system of claim 34, wherein the system further comprises the memory, and wherein the memory is one of:

virtual memory,

GPU global memory, local memory, or shared memory.

41. A method, comprising:

at a device:

responsive to a memory access request having a pointer to an object in memory, determining a page corresponding to the pointer;

processing page-level metadata stored for the page to locate object-level metadata stored for the object, including:

(a) reading a type of the page directly from a first portion of the page-level metadata, the type of the page being one of a single-object page configured to store a single object or a multiple-object page configured to store a plurality of objects, (b) responsive to determining that the type of the page is the single-object page, reading a location of the object-level metadata directly from a second portion of the page-level metadata, and (c) responsive to determining that the type of the page is the multiple-object page, reading a location of a page bit vector directly from a third portion of the page-level metadata, the page bit vector configured to track locations of object base addresses, reading a location of a page bit vector type directly from a fourth portion of the page-level metadata, and using the page bit vector and the page bit vector type to determine the location of the object-level metadata;

performing a memory safety check using the object-level metadata;

when the memory safety check indicates an unsafe memory condition, returning an indication of the unsafe memory condition; and when the memory safety check indicates a safe memory condition, performing the memory access.

42. The method of claim 41, wherein the pointer points to an arbitrary location in the object.

43. The method of claim 41, wherein using the page bit vector and the page bit vector type to determine the location of the object-level metadata includes:

computing an offset within the page bit vector and an offset within the page bit vector type, based on the pointer, and determining from the page bit vector type at a location indicated by the offset within the page bit vector type whether a preconfigured portion of the page bit vector at a location indicated by the offset within the page bit vector corresponds to a single object or to multiple objects.

44. The method of claim 43, wherein using the page bit vector and the page bit vector type to determine the location of the object-level metadata further includes:

responsive to determining that the preconfigured portion of the page bit vector corresponds to a single object, locating the object-level metadata from the offset in the preconfigured portion of the page bit vector.

45. The method of claim 43, wherein using the page bit vector and the page bit vector type to determine the location of the object-level metadata further includes:

responsive to determining that the preconfigured portion of the page bit vector corresponds to multiple objects, backward scanning the portion of the page bit vector from the pointer until an entry in the portion of the page bit vector is found to locate the object-level metadata.

46. The method of claim 41, wherein the object-level metadata includes a size of the object.

47. The method of claim 46, wherein the object-level metadata further includes a tag.

48. The method of claim 46, wherein processing the object-level metadata includes using the size of the object to perform the memory safety check.

49. The method of claim 41, wherein the object-level metadata is stored adjacent to the object in the memory.

50. The method of claim 49, wherein the object-level metadata is stored as a header to the object in the memory.

51. The method of claim 41, wherein the object-level metadata is located at a base address of the object.

52. The method of claim 41, wherein the object-level metadata is stored when the object is created.

53. The method of claim 41, wherein the page-level metadata records a location of the object-level metadata.

54. The method of claim 41, wherein the page-level metadata is stored when the object is created.

55. The method of claim 41, wherein the method is implemented using one of:

a combination of software and hardware, only software, or only hardware.

56. The method of claim 55, wherein the hardware is one of:

a graphics processing unit (GPU), or a central processing unit (CPU).

57. The method of claim 41, wherein the memory is at least one of:

virtual memory,

GPU global memory, local memory, or shared memory.

58. A method, comprising:

at a device:

responsive to a memory access request having a pointer to an object in memory, accessing a portion of memory storing a bit vector comprised of a plurality of entries each corresponding to a different memory address, wherein each entry of the plurality of entries is set to a first predefined value when the corresponding memory address is an object base address and is set to a second predefined value when the corresponding memory address is not an object base address;

using the bit vector to locate object-level metadata stored for the object by:

(a) accessing a first entry of the bit vector that corresponds with a first memory address pointed to by the pointer, (b) reading a value of the first entry to determine whether the first memory address pointed to by the pointer is a base address for the object, (c) responsive to determining that the first memory address pointed to by the pointer is the base address for the object, accessing the object-level metadata at the first memory address, and (d) responsive to determining that the first memory address pointed to by the pointer is not the base address for the object, backward scanning the bit vector from the first entry to a nearest second entry set to the first predefined value, and accessing the object-level metadata at a second memory address corresponding to the nearest second entry; and performing at least one task specific to the object using the object-level metadata.

59. The method of claim 58, wherein each entry of the plurality of entries is a single bit.

60. The method of claim 58, wherein the at least one task includes one or more of:

providing memory safety, performing type checking in memory safe languages, computing data encryption and authentication, providing hints to caches and hardware data prefetchers for software-tuned replacement and prefetching policies, or collecting object-aware hardware performance counters.

* * * * *